(12) United States Patent
Oh et al.

(10) Patent No.: US 6,945,079 B2
(45) Date of Patent: Sep. 20, 2005

(54) OPTICAL FIBER DRAWING SYSTEM FOR NON-CONTACT CONTROL OF POLARIZATION MODE DISPERSION OF OPTICAL FIBER

(75) Inventors: Sung-Koog Oh, Kumi-shi (KR); Jin-Han Kim, Kumi-shi (KR)

(73) Assignee: Samsung-Electronics Co., Ltd., Suwon-Si (KR)

( * ) Notice: Subject to any disclaimer, the term of this patent is extended or adjusted under 35 U.S.C. 154(b) by 235 days.

(21) Appl. No.: 10/619,786

(22) Filed: Jul. 15, 2003

(65) Prior Publication Data

US 2004/0011083 A1 Jan. 22, 2004

Related U.S. Application Data

(62) Division of application No. 09/981,940, filed on Oct. 17, 2001.

(30) Foreign Application Priority Data

Jan. 29, 2001 (KR) .......................................... 2001-4060

(51) Int. Cl.[7] .......................... C03B 37/029; C03B 37/07
(52) U.S. Cl. ............................ 65/489; 65/540; 65/537; 65/534; 65/530; 65/504
(58) Field of Search .......................... 65/504, 530, 534, 65/537, 540, 310, 435, 489

(56) References Cited

U.S. PATENT DOCUMENTS

| | | | | |
|---|---|---|---|---|
| 4,030,901 A | * | 6/1977 | Kaiser | 65/424 |
| 4,407,666 A | * | 10/1983 | Briere | 65/435 |
| 4,925,473 A | * | 5/1990 | Jeskey et al. | 65/384 |
| 4,988,374 A | * | 1/1991 | Harding et al. | 65/435 |
| 5,059,229 A | * | 10/1991 | Blankenship et al. | 65/424 |
| 5,897,681 A | * | 4/1999 | Lysson et al. | 65/435 |
| 6,192,715 B1 | * | 2/2001 | Orita et al. | 65/489 |
| 6,381,990 B1 | * | 5/2002 | Ball et al. | 65/483 |
| 6,474,109 B1 | * | 11/2002 | deFouw et al. | 65/435 |
| 6,640,589 B1 | * | 11/2003 | Sakashita et al. | 65/435 |
| 6,810,692 B2 | * | 11/2004 | Taru et al. | 65/435 |
| 2002/0088253 A1 | * | 7/2002 | Roba et al. | 65/481 |
| 2004/0099015 A1 | * | 5/2004 | Leppert | 65/424 |
| 2004/0107736 A1 | * | 6/2004 | Schuepbach et al. | 65/435 |
| 2004/0114895 A1 | * | 6/2004 | Okazaki et al. | 385/123 |

* cited by examiner

*Primary Examiner*—John Hoffmann
(74) *Attorney, Agent, or Firm*—Cha & Reiter, L.L.C.

(57) ABSTRACT

Disclosed is a system for drawing an optical fiber for controlling polarization mode dispersion. A furnace is provided for uniformly heating an optical fiber preform in the drawing system mounted to an optical fiber draw tower. The furnace comprises: (a) a main body; (b) a sub-body placed coaxially with the main body and having a diameter smaller than that of the main body; and (c) an upper gas feeding section over the main body, wherein the upper gas feeding section includes a first hollow rotary body having at least one slit in the inner surface thereof along the longitudinal direction of an optical fiber and at least one opening extended in the direction of the center, whereby a gas artificially/periodically creates non-contact polarization to the optical fiber by the first hollow rotary body. Effective non-contact control can be carried out about polarization mode dispersion of the optical fiber.

6 Claims, 9 Drawing Sheets

OPTICAL FIBER DRAWING SYSTEM FOR NON-CONTACT CONTROL OF POLARIZATION MODE DISPERSION OF OPTICAL FIBER

This application is a Divisional Application of U.S. Ser. No. 09/981,940, filed Oct. 17, 2001.

This application makes reference to and claims all benefits accruing under 35 U.S.C. Section 119 from an application entitled "NON-CONTACT TYPE OPTICAL FIBER DRAWING SYSTEM FOR CONTROLLING POLARIZATION MODE DISPERSION OF OPTICAL FIBER" applied with the Korean Industrial Property Office on Jan. 29, 2001 and there duly assigned Ser. No. 2001-4060.

BACKGROUND OF THE INVENTION

1. Field of the Invention

The invention relates to a manufacturing process for forming an optical fiber, and more particularly to a system that is used in the drawing process of producing optical fibers to prevent polarization mode dispersion.

2. Description of the Related Art

In general, an optical fiber manufacturing process involves a process of preparing an optical fiber preform, and a process of drawing an optical fiber from the prepared optical fiber preform. In such a drawing process, a standing drawing tower is used which heats, melts, and draws an optical fiber preform to produce an optical fiber.

U.S. Pat. No. 5,298,047 entitled, "Method of Making a Fiber Having Low Polarization Mode Dispersion due to a Permanent Spin" and U.S. Pat. No. 6,076,376 entitled "Method of Making an Optical Fiber Having an Imparted Twist", disclose an arrangement for applying a spin to an optical fiber that is drawn during the fiber operation, so that an optical fiber can be rolled by the swing motion of a swing guide roller.

Figure 1:
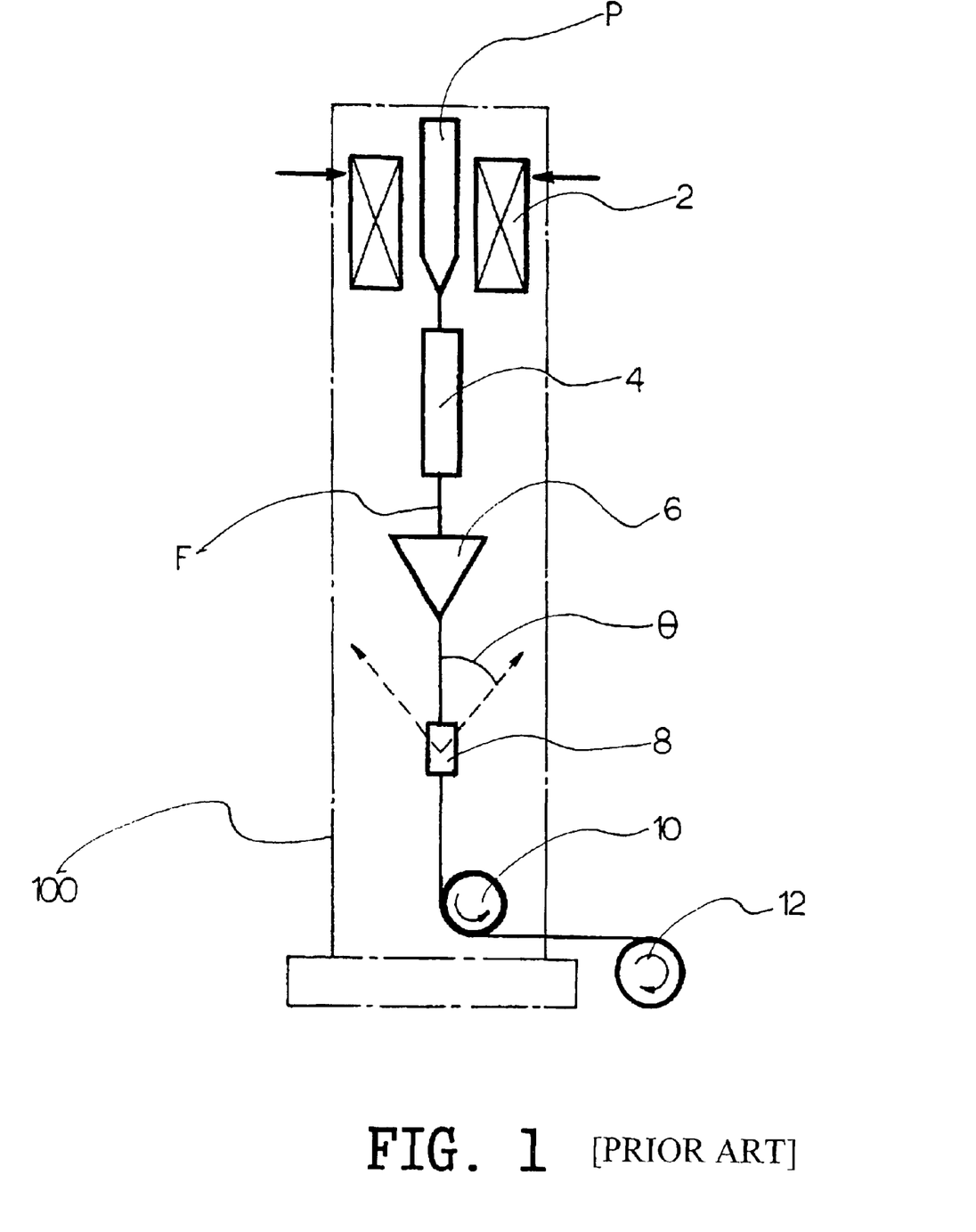
FIG. 1 shows a configuration of an optical fiber drawing system for controlling polarization mode dispersion of the related art.

FIG. 1 shows a conventional draw tower that is used to draw an optical preform to produce an optical fiber. As shown in FIG. 1, the fiber drawing process is vertically arranged in sequence into different steps within the draw tower. Initially, an optical fiber preform P is melted at a sufficient temperature, at least about 2000° C., in the furnace, then drawn about the central axis of the draw tower 100. The diameter of the drawn optical fiber F is controlled using a diameter regulator (not shown) and then cooled to a temperature that is suitable for coating the optical fiber via a cooling unit 4. The cooled optical fiber is coated while passing through a coater 6. Here, the coater 6 can includes a first coater and a second coater. The coated optical fiber passes through a number of ultraviolet curing apparatus (not shown) where the ultraviolet curing polymer coated on the optical fiber is cured. The ultraviolet cured optical fiber F is twisted using a pair of rollers 8 that is canted by an angle θ, and its polarization effect is suppressed. Thereafter, the optical fiber passes a capstan 10 and through a number of rollers to reach the winder 12 where the optical fiber is wound. The capstan 10 imparts a certain tensile force to the optical fiber preform so that the optical fiber can be drawn with a certain diameter size.

In the drawing process of the related art, the coated optical fiber directly contacts with the pair of rollers 8 and then twisted according to the canting motion of the rollers which helps to smooth the polarization mode dispersion of the optical fiber. However, the related art has the following problems: First, vibration in a transverse direction is incurred to the optical fiber due to a direct contact and high speed drawing operation, thereby causing it difficult to control the outer diameter of the optical fiber. Second, as the optical fiber contacts directly with the guide roller, the optical fiber can be weakened according to the surface state of the roller, and this can be fatal the optical fiber. Third, a precise control of coating the outer diameter is difficult as the optical fiber is periodically vibrated when the drawing speed is high. Also, in the case of wet-on-wet type coating, the high speed drawing that is stable is difficult to achieve as the first and second coating materials are mixed to cause coating instability.

SUMMARY OF THE INVENTION

Accordingly, the present invention has been proposed to solve the foregoing problems of the related art, thus directed to an apparatus capable of non-contact control of the polarization mode dispersion during an optical fiber drawing process.

According to an embodiment of the invention, there is provided a furnace for uniformly heating an optical fiber preform in the drawing systems mounted to an optical fiber draw tower, the furnace comprising: (a) a main body; (b) a sub-body placed coaxially with the main body and having a diameter smaller than that of the main body; and (c) an upper gas feeding section over the main body, wherein the upper gas feeding section includes a first hollow rotary body having at least one slit in the inner surface thereof along the longitudinal direction of an optical fiber and at least one opening extended in the direction of the center, whereby a gas artificially/periodically creates non-contact polarization to the optical fiber by the first hollow rotary body.

According to another embodiment of the invention, there is there is provided an apparatus for cooling an optical fiber that is drawn from an optical fiber preform in the drawing systems mounted to an optical fiber draw tower, the apparatus comprising: (a) a main body extended in length; and (b) an upper gas feeding section over the main body, wherein the upper gas feeding section includes a first hollow rotary body having at least one slit in the inner surface thereof along the longitudinal direction of the optical fiber and at least one opening extended in the direction of the center, whereby a gas artificially/periodically creates non-contact polarization to the optical fiber by the first hollow rotary body.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

In general, light is a type of electromagnetic waves which basically exists in electric and magnetic modes. These two modes constitute one pair in the propagating free space. However, when light passes within a material, instead of free space, a degree of polarization thereof can be varied according to the physical properties of the material. In particular, the velocity of light can be varied when refractive index is not constant. Therefore, a geometric structure of the core area for transmitting light in the optical fiber serves an important role in light transmission. If the geometric structure is distorted, the refractive index distribution of the core is one-sided, thus the two polarization modes propagate with different speed about the longitudinal direction. Hence, when a signal is received after propagating a long distance, the two modes have time delay and will not arrive at the same time. Diffusion of light signal due to such time delay is called polarization mode dispersion (PMD) or dispersion diffusion.

Ideally, such polarization mode dispersion will not take place if the geometric structure of the fiber core area is a perfect circle. In practice, it is impossible to realize the geometric structure of the optical fiber core area as a perfect circle. Therefore, the present invention relates to an apparatus capable of non-contact controlling of the polarization mode dispersion, which takes place due to the geometric structure of such core area.

Figure 2:
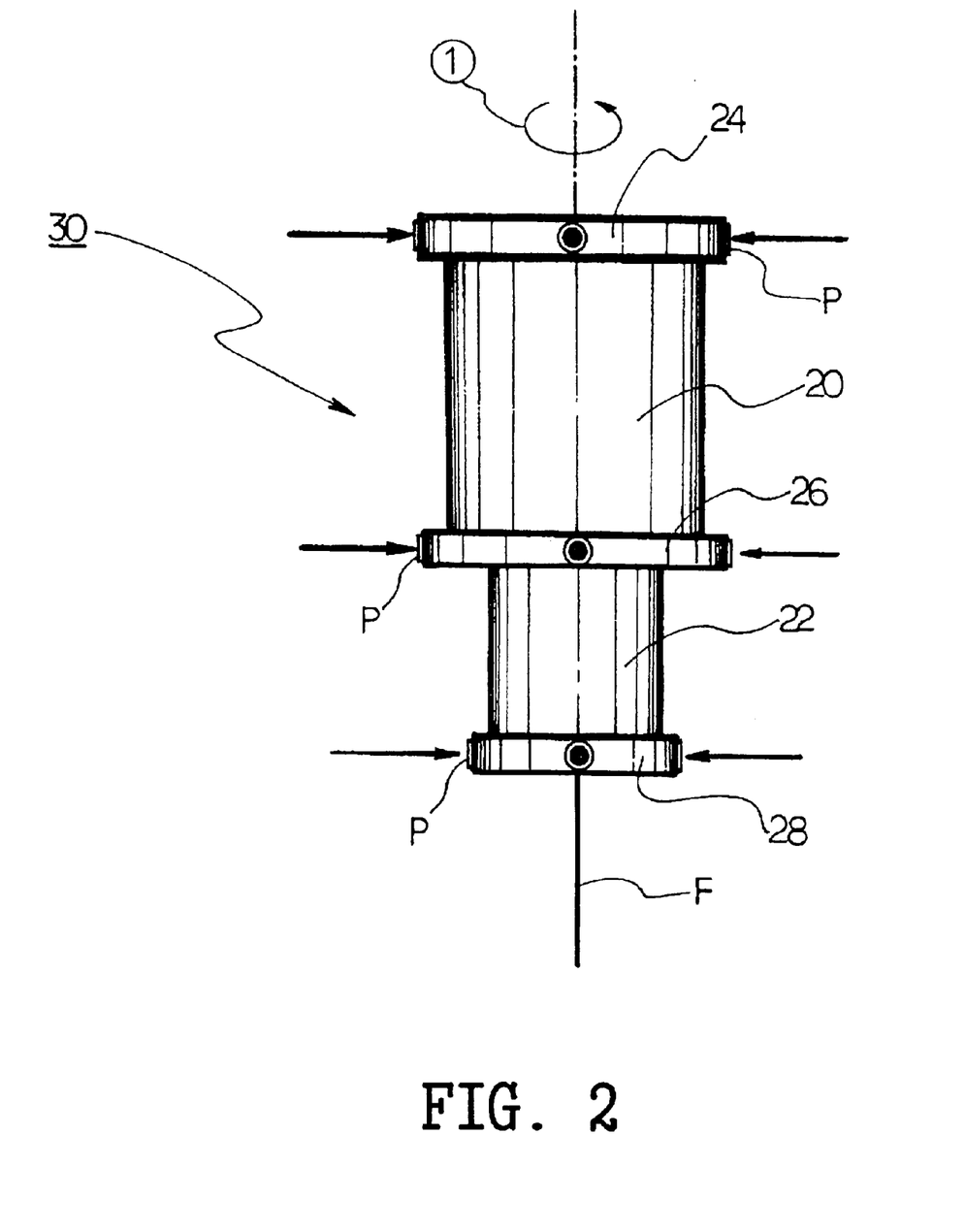
FIG. 2 is a front elevation view for showing a configuration of the furnace for controlling polarization mode dispersion according to the present invention.
Figure 3:
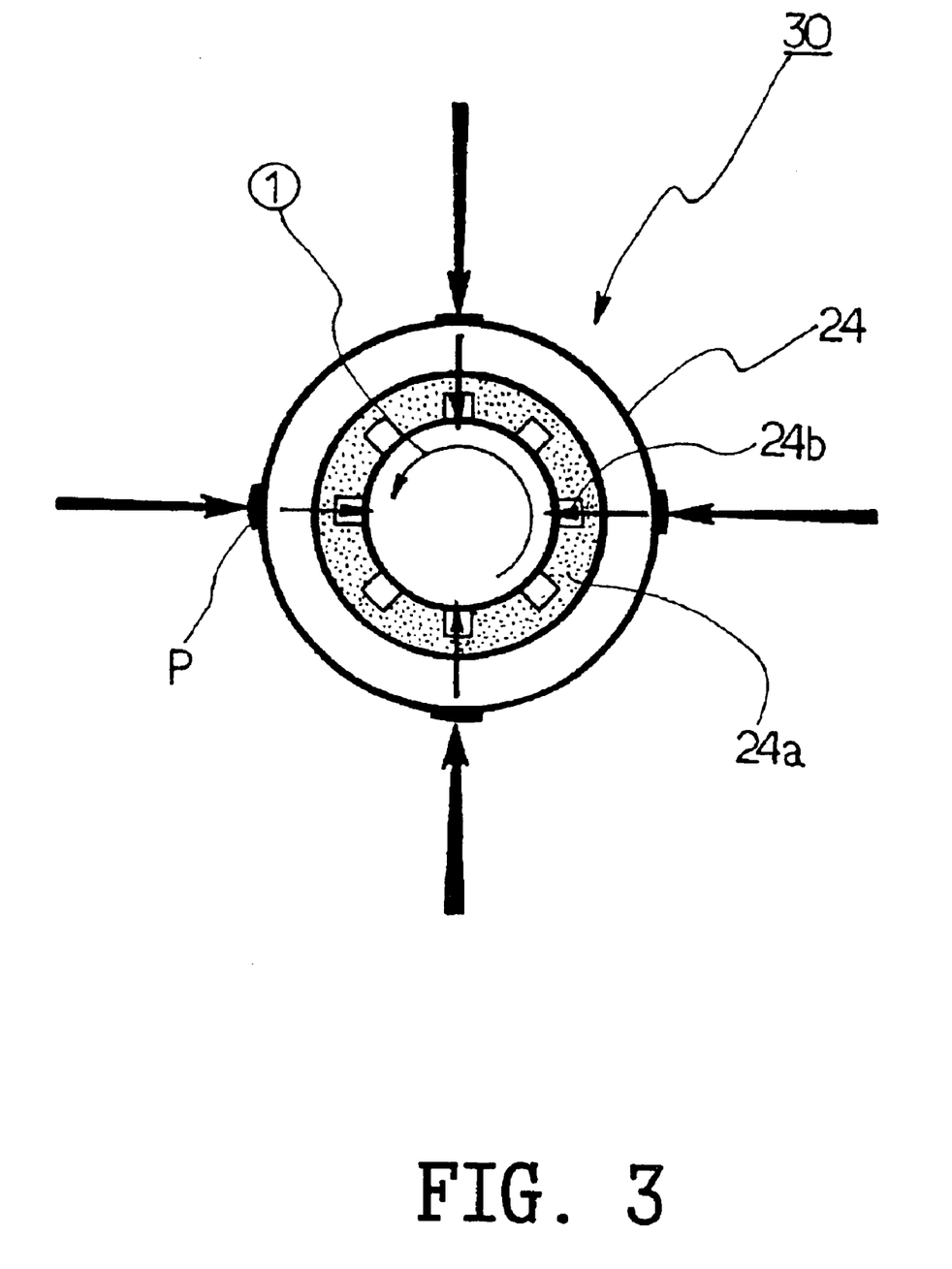
FIG. 3 is a plan view for showing a configuration of the furnace for controlling polarization mode dispersion according to the present invention.
Figure 4:
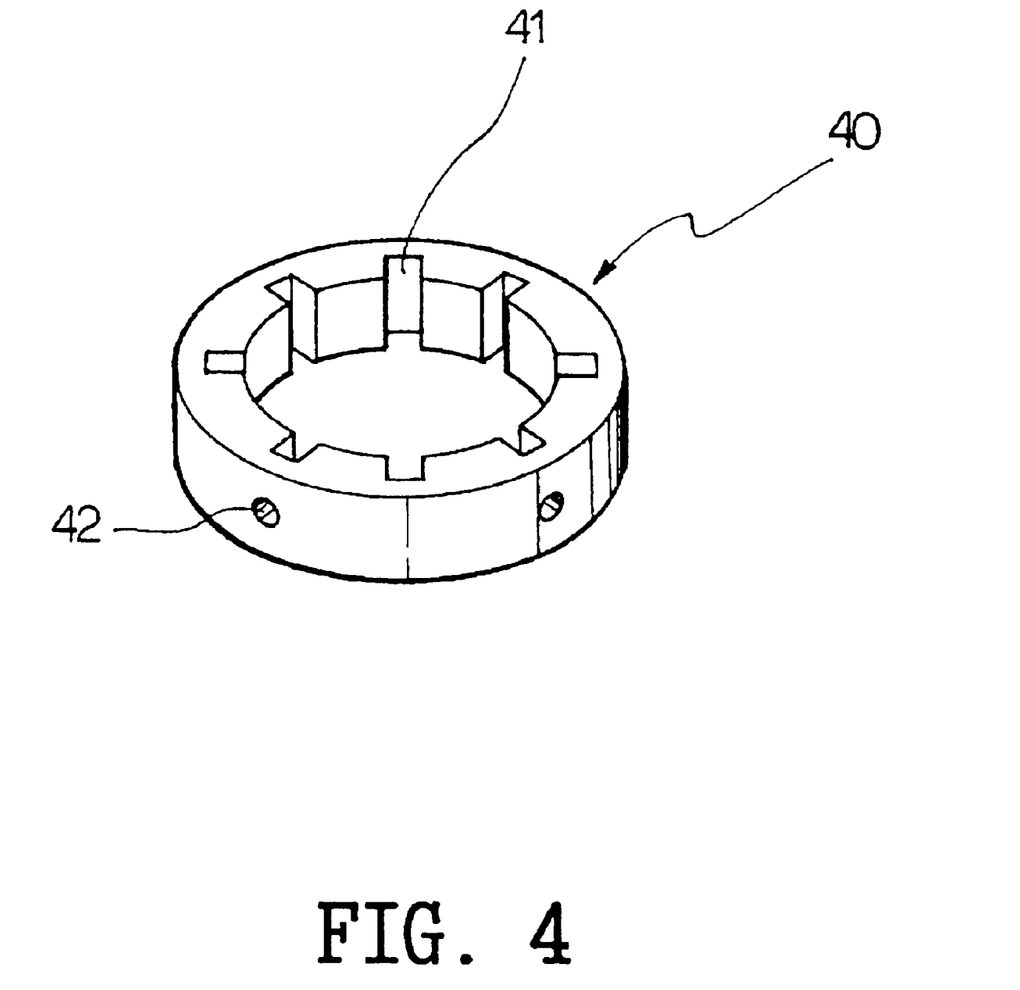
FIG. 4 is a perspective view for showing a rotary body according to the first embodiment of the invention.

FIG. 2 to FIG. 4 show the configuration of a furnace 30 and a cooling unit 70 of an optical fiber drawing system that is used in the drawing process for controlling polarization mode dispersion according to the embodiment of the present invention.

Figure 5:
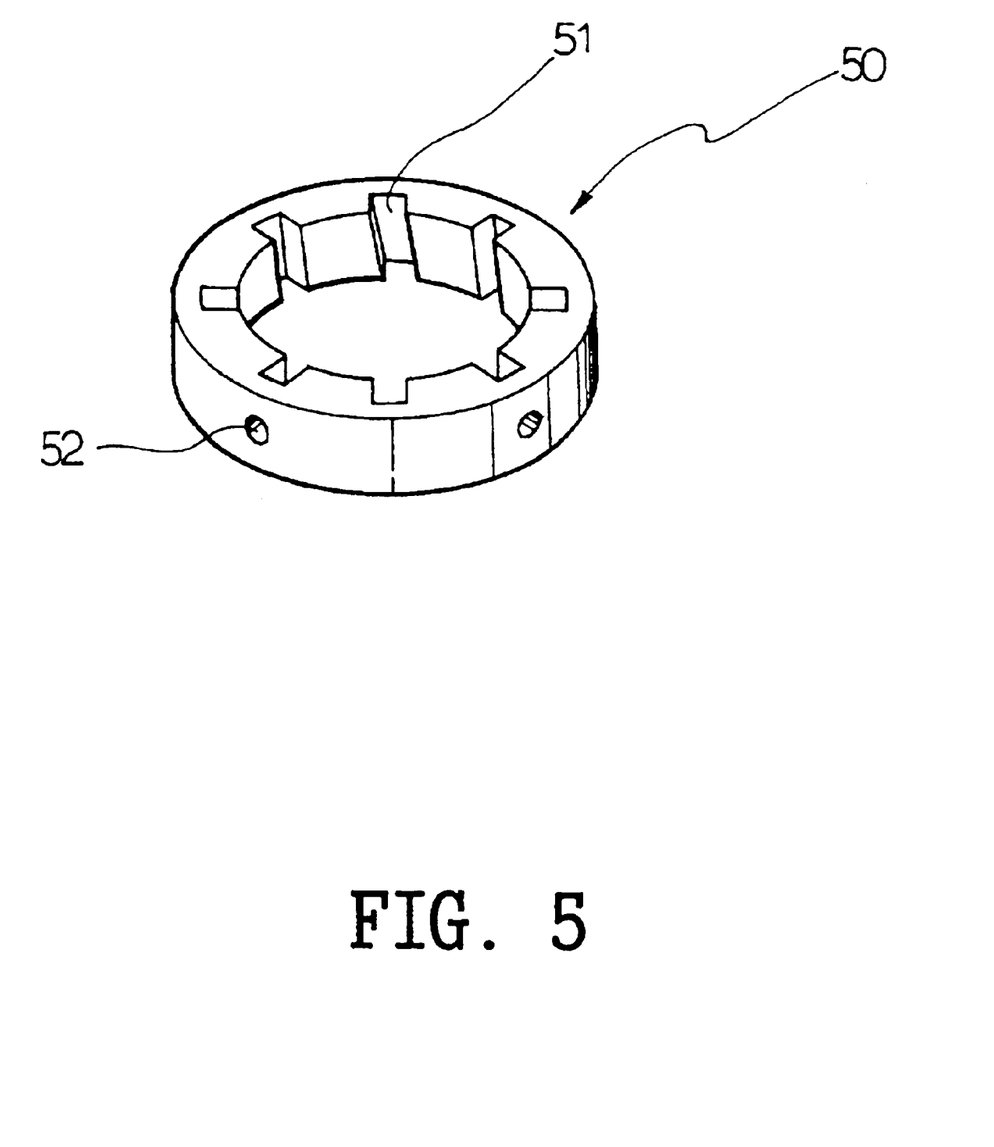
FIG. 5 is a perspective view for showing a rotary body according to the second embodiment of the invention.

In particular, FIGS. 2 and 3 illustrates the furnace for heating and melting,an optical fiber preform and FIGS. 4 and 5 illustrates the cooling unit. To prevent the oxidation and dust that may lower the characteristics of the drawn optical fiber, the furnace and the cooling unit are fed with an anti-oxidizing gas, which includes He, Ar, $N_2$ and the like. Such an anti-oxidizing gas has a great effect on qualities of the optical fiber according to type, flow rate, mixing ratio thereof and the like.

Accordingly, the present invention provides a certain angle of feeding direction to a gas, which is fed into the furnace so that the anti-oxidizing gas can be fed sequentially and periodically into the furnace or the cooling unit. Accordingly, the invention is made to periodically incur a minute deformation to the optical fiber.

Referring to FIG. 2 and FIG. 3, the furnace 30 according to the invention includes a main body 20 and a sub-body 22, which is aligned coaxially with the main body 20 and has a diameter smaller than that of the main body 20. Also, an upper gas feeding section 24 is placed over the main body 20, a middle gas feeding section 26 is placed between the main body 20 and the sub-body 22, and a lower gas feeding section 28 is placed under the sub-body 22. Each of the gas feeding sections 24, 26 and 28 includes a rotary body 24a, as shown in FIG. 3. The upper gas feeding section 24 includes the rotary body 24a with at least one slit 24b. Similarly, the middle gas feeding section 26 includes a rotary body (not shown) with at least one slit, the lower gas feeding section 28 includes a rotary body (not shown) with at least one slit. In addition, for each of the gas feeding sections 24, 26 and 28, a plurality of slits 24b are radially provided with a uniform gap and extended along the longitudinal direction of the optical fiber F, or the drawing direction of the optical fiber. In other words, the slits are extended along the longitudinal direction of the rotary body 24a.

Furthermore, each of the gas feeding sections 24, 26 and 28 has a plurality of gas feeding ports P which are arranged symmetrically along at least two lines which are radially extended. Four gas feeding ports P are provided, as shown in FIG. 2 and FIG. 3, for illustrative purposes. However, the number of ports should not impose limitations on the scope of the invention Each of the gas feeding ports P includes an on/off switch.

In the embodiment of the invention, as the rotary bodies (including the rotary bodies of the upper gas feeding section 24, the middle gas feeding section 26, and the lower gas feeding 28) are rotated along the direction of arrow ①, the gas feed into the furnace 30 becomes asymmetric instead of uniform in all directions, thereby incurring deformation of the optical fiber due to a temperature difference in the lower end of an optical fiber preform that has sufficiently softened. The difference temperature in the surface of the optical fiber has effects on not only the surface deformation of the optical fiber, such as non-circularity of the optical fiber, but also oval of the core area due to stress difference in a cooling process. That is, the present invention generates a mode coupling in the drawn optical fiber by inducing surface deformation periodically in the optical fiber preform that is softened during the drawing process, thus reducing polarization mode dispersion (PMD) of the optical fiber. It is noted that it is well known in the art that when light signal is transmitted in a non-circular optical fiber, the PMD can be decreased if the mode-coupling is generated. Hence, the present invention incurs artificially finite surface deformation in the optical fiber preform using the rotary body of a gas feeding section. Thereafter, the deformed optical fiber preform increases the PMD of the drawn optical fiber. Here, the artificially induced surface deformation in the optical fiber preform is caused based on the rotation speed of the rotary body of a gas feeding section and the amount of gas flow into inside furnace.

As a result, the oval area of the fiber core creates polarization. Polarization mode dispersion or dispersion based upon such polarization is expressed as the sum of the whole accumulated delay caused by such polarization about the longitudinal direction of the optical fiber F. Therefore, about the rotation direction of the optical fiber F, the polarization direction can be periodically changed in succession about the rotation direction thereby allowing the mean value to substantially converge to zero. Thus, the polarization direction of the optical fiber generated according to the longitudinal direction of the optical fiber is periodically repeated and rotated so that an average value of the PMD is substantially converge to zero. As a method of artificially inducing such polarization of the optical fiber, all of the on/off switches connected to the gas feeding ports P are turned on and the rotary body 24a including the slits 24b is rotated, and alternatively, the rotary body 24a including the slits 24b is fixed and gas feed to the gas feeding ports P is sequentially set on/off about the rotation direction.

Here, the degree of polarization can be varied according to the included angle of the slits 24b; gap of the slits 24b; rotation speed of the rotary body 24a; type, flow rate and current speed of the gas fed to the gas feeding sections 24, 26 and 28; operation procedure and periodicity of the on/off switches connected to the gas feeding ports P. Therefore, the invention can be regulated by position and combination of parts which are wanted for control.

Figure 6:
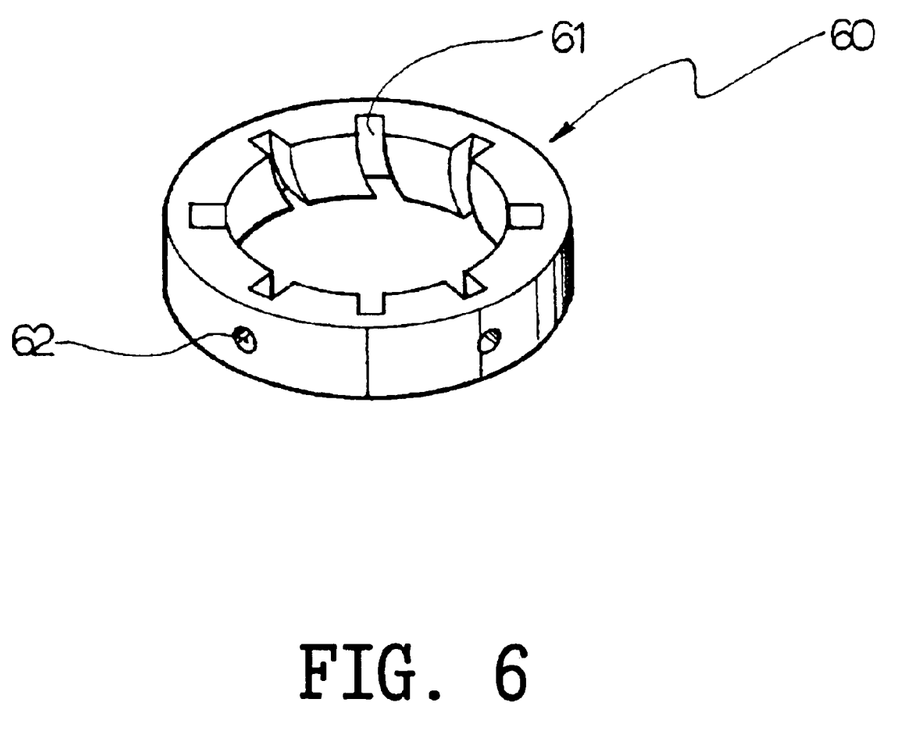
FIG. 6 is a perspective view for showing a rotary body according to the third embodiment of the invention.

Referring to FIG. 4 to FIG. 6, various embodiments of the rotary bodies adopted in the invention are shown Referring to FIG. 4, a rotary body 40 according to the first embodiment of the invention can be equivalently applied to the furnace and the cooling unit. The rotary body 40 is shaped as a hollow cylinder, and has slits 41 linearly extended along the longitudinal direction of the optical fiber. The slits 41 are provided symmetrically. The rotary body 40 shown in FIG. 4 has gas-communicating openings 42, which communicate with the gas feeding sections to allow gas passage. The openings 42 are preferably arranged symmetrically along the radial direction. The openings 42 are extended toward the center of the rotary body 40. In addition, the openings preferably communicate with the slits 41 for effective polarization mode dispersion.

Referring to FIG. 5, a rotary body 50 according to the second embodiment of the invention can be equivalently applied to the furnace and the cooling unit. The rotary body 50 is shaped as a hollow cylinder, and has slits 51 extended along the longitudinal direction of the optical fiber. The slits 51 are extended along a certain angle of inclined direction about the longitudinal direction of the optical fiber. The slits 51 are provided symmetrical. The rotary body 50 shown in FIG. 5 has gas-communicating openings 52, which communicate with the gas feeding sections to allow gas passage. The openings 52 are preferably arranged symmetrically along the radial direction. Here, the openings 52 are extended toward the center of the rotary body 50. In addition, the openings preferably communicate with the slits 51 for effective polarization mode dispersion.

Referring to FIG. 6, a rotary body 60 according to the second embodiment of the invention can be equivalently applied to the furnace and the cooling unit. The rotary body 60 is shaped as a hollow cylinder, and has slits 61 extended along the longitudinal direction of the optical fiber. The slits 61 are spirally extended about the longitudinal direction of the optical fiber. The slits 61 are provided symmetrical. The rotary body 60 shown in FIG. 6 has gas-communicating openings 62, which communicate with the gas feeding sections to allow gas passage. The openings 62 are preferably arranged symmetrically along the radial direction. Here, the openings 62 are extended toward the center of the rotary body 60. In addition, the openings preferably communicate with the slits 61 for effective polarization mode dispersion.

Figure 7:
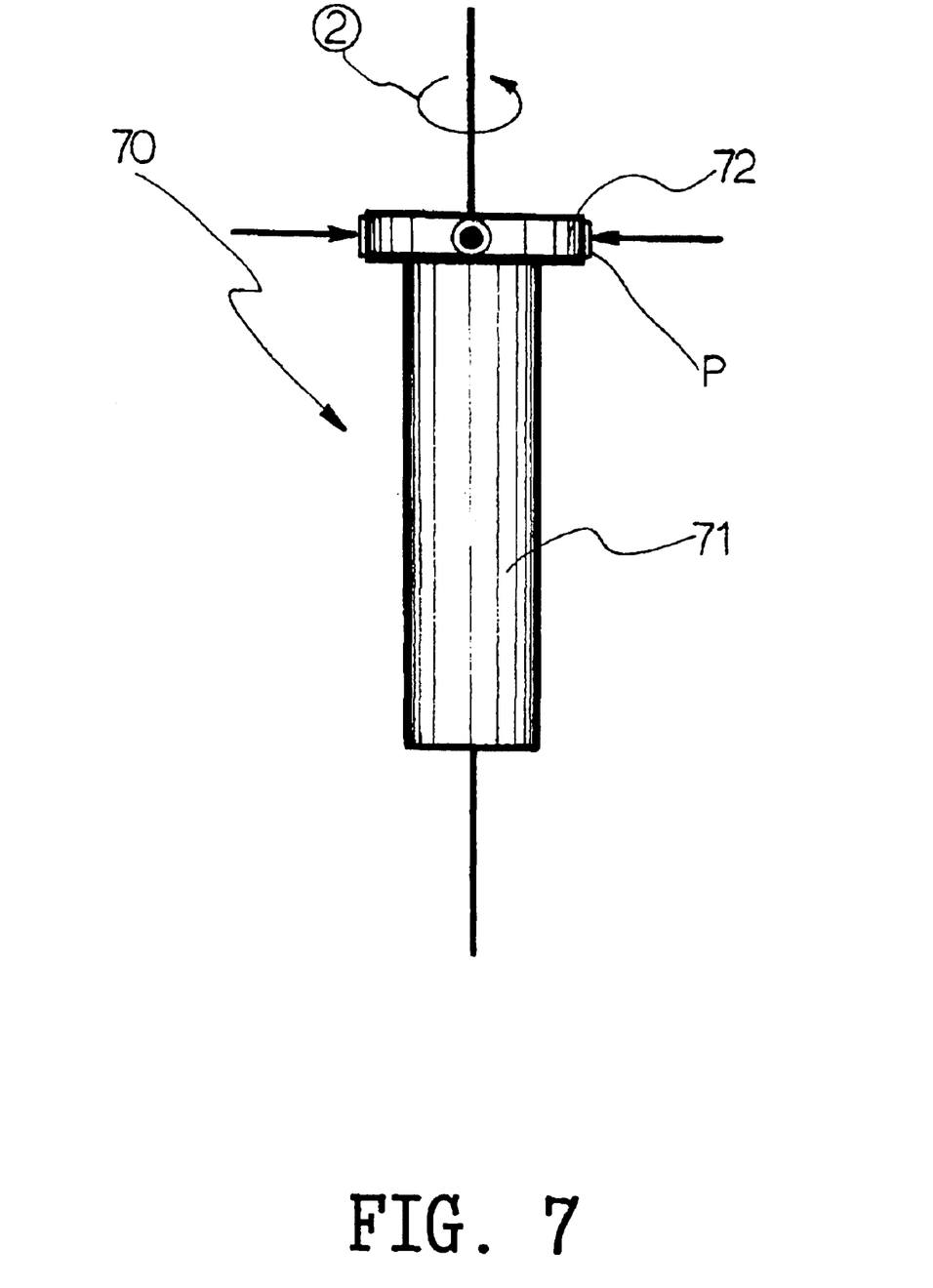
FIG. 7 is a front elevation view for showing a configuration of the cooling apparatus for controlling polarization mode dispersion according to the present invention.
Figure 8:
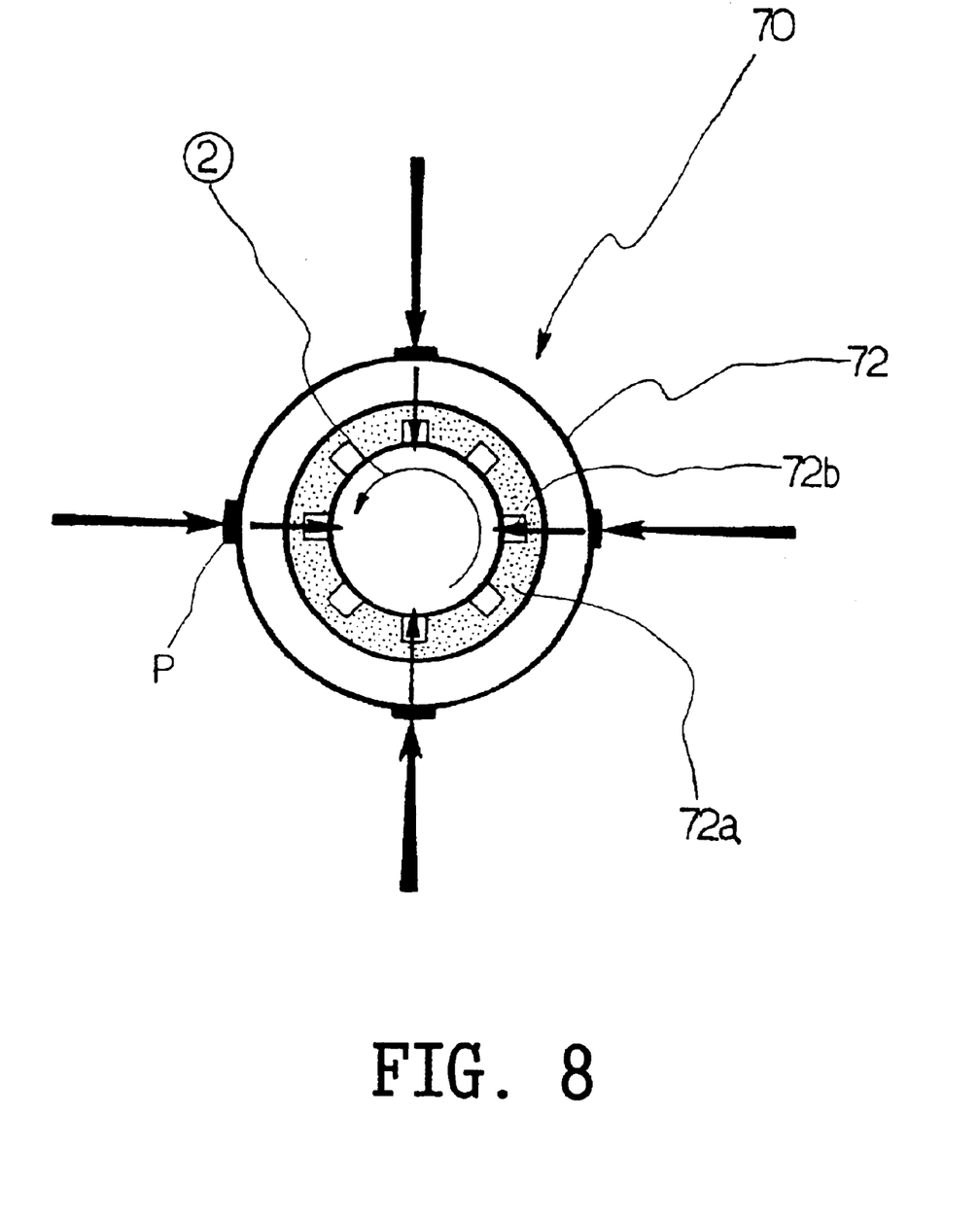
FIG. 8 is a plan view for showing a configuration of the cooling apparatus for controlling polarization mode dispersion according to the present invention; and, FIG. 9 illustrates the variation of the polarization direction about the longitudinal direction of the optical fiber according to the present invention.

FIG. 7 and FIG. 8 shows a cooling unit 70 of the optical fiber drawing system. The cooling unit 70 has a gas feeding section 72 with a rotary body 72a over a main body 71. The rotary body 72a of the gas feeding section 72 has at least one slits 72b. Also, the main body 71 and the rotary body 72a are shaped as a cylinder, and the rotary body 72a rotates along an arrow ②. The rotary body 72a can be substituted by the rotary body shown in FIG. 4 to FIG. 6.

Flow rate of the gas fed to the furnace 30 or the cooling unit 70 of the invention is controlled a flow regulator (not shown), rotation speed of the rotary body with the slits, position of a rotating part, on/off control of the gas feeding ports and kind of the gas are controlled by using a controlling computer.

Figure 9:
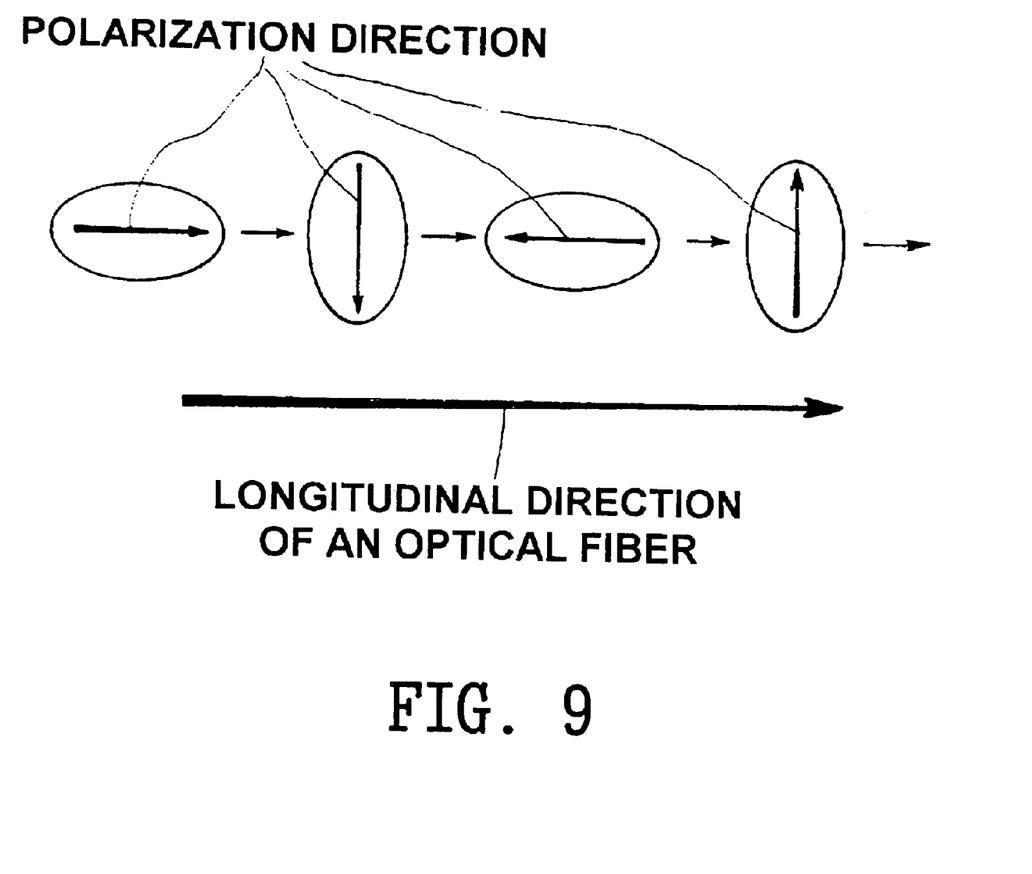

As shown in FIG. 9, in the optical fiber drawn out in length, when the polarization directions are changed along arrows, the two modes have the same mean propagating speed. As a result, polarization mode dispersion due to polarization can be removed. The polarization directions represent deviation of the optical fiber core from circularity.

As described hereinbefore, the invention controls the polarization direction of the optical fiber via non-contact scheme without using a direct twisting scheme with contact of the related art, thereby effectively controlling polarization mode dispersion which is one of the largest restrictions of the high speed/mass storage optical communication.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A furnace for uniformly heating an optical fiber preform in an optical fiber draw tower, said furnace comprising:

a main body;

a sub-body placed coaxially with said main body and having a diameter smaller than said main body; and, an upper gas feeding section disposed over said main body, wherein said upper gas feeding section includes a first hollow rotary body having at least one slit in the inner surface thereof along the longitudinal direction of an optical fiber and at least one opening extended in the direction of the center, whereby a gas creates non-contact polarization to the optical fiber through said first hollow rotary body.

2. The furnace according to claim 1, further comprising a middle gas feeding section between said main body and said sub-body, wherein said middle gas feeding section includes a second hollow rotary body having at least one slit in the longitudinal direction of the optical fiber.

3. The furnace according to claim 1, further comprising a lower gas feeding section under said sub-body, wherein said lower gas feeding section includes a third hollow rotary body having at least one slit along the longitudinal direction of the optical fiber.

4. The furnace according to claim 1, wherein said slit is linearly extended about the longitudinal direction of the optical fiber.

5. The furnace according to claim 1, wherein said slit is inclined at an angle about the longitudinal direction of the optical fiber.

6. The furnace according to claim 1, wherein said slit is spirally provided about the longitudinal direction of the optical fiber.

* * * * *